US008607239B2

(12) United States Patent
Anand et al.

(10) Patent No.: US 8,607,239 B2
(45) Date of Patent: Dec. 10, 2013

(54) LOCK MECHANISM TO REDUCE WAITING OF THREADS TO ACCESS A SHARED RESOURCE BY SELECTIVELY GRANTING ACCESS TO A THREAD BEFORE AN ENQUEUED HIGHEST PRIORITY THREAD

(75) Inventors: Vaijayanthimala K. Anand, Austin, TX (US); David A. Hepkin, Austin, TX (US); Dirk Michel, Austin, TX (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 12/651,294

(22) Filed: Dec. 31, 2009

(65) Prior Publication Data

US 2011/0161539 A1 Jun. 30, 2011

(51) Int. Cl.
*G06F 9/46* (2006.01)
*G06F 12/00* (2006.01)

(52) U.S. Cl.
USPC ........... 718/103; 718/104; 718/102; 718/107; 718/108; 718/100; 710/200; 710/240; 707/999.008

(58) Field of Classification Search
None
See application file for complete search history.

(56) References Cited

U.S. PATENT DOCUMENTS

| | | | |
|---|---|---|---|
| 7,051,026 B2 * | 5/2006 | Berry et al. ............ | 707/999.008 |
| 7,065,765 B2 | 6/2006 | Cadden et al. | |
| 7,209,990 B2 * | 4/2007 | Pruscino et al. .............. | 710/200 |
| 7,308,448 B1 | 12/2007 | Martin | |
| 7,383,368 B2 | 6/2008 | Schopp | |
| 7,448,036 B2 * | 11/2008 | Brenner et al. ................ | 718/103 |
| 7,844,973 B1 * | 11/2010 | Dice .............................. | 718/108 |
| 8,020,166 B2 * | 9/2011 | Ruemmler ..................... | 718/104 |
| 8,132,171 B2 * | 3/2012 | Ruemmler ..................... | 718/102 |
| 2008/0028406 A1 | 1/2008 | Jonnala et al. | |
| 2008/0163217 A1 | 7/2008 | Accapadi et al. | |

\* cited by examiner

*Primary Examiner* — Jennifer To
*Assistant Examiner* — Bing Zhao
(74) *Attorney, Agent, or Firm* — Yee & Associates, P.C.; David A. Mims, Jr.

(57) ABSTRACT

Two or more processors that each provides a specified thread to access a shared resource that can only be accessed by one thread at a given time. A locking mechanism enables one of the threads to access the shared resource while other threads are retained in a waiting queue. Responsive to an additional thread that is not one of the specified threads being provided access the shared resource during an identified time period, and responsive to a first criterion an a second criterion being met, the additional thread accesses the shared resource before the other threads in the waiting queue.

18 Claims, 3 Drawing Sheets ured to access the shared resource at the same time.
LOCK MECHANISM TO REDUCE WAITING OF THREADS TO ACCESS A SHARED RESOURCE BY SELECTIVELY GRANTING ACCESS TO A THREAD BEFORE AN ENQUEUED HIGHEST PRIORITY THREAD

BACKGROUND

1. Field

The invention disclosed and claimed herein generally relates to a method for reducing the time that successive threads spend waiting to access a shared resource, wherein the threads are respectively provided by different processors. More particularly, the invention pertains to a method of the above type wherein a locking mechanism such as a handoff lock enables a thread to opportunistically gain access to the shared resource, ahead of threads which were previously waiting for access.

2. Description of the Related Art

As is well known by those of skill in the art, threads produced by different processors in a processor configuration may each seek to access a shared resource at the same time. The shared resources could be a specified database, a data object or a hardware device, by way of example. However, the shared resource may allow access to only one thread at any given time. Accordingly, locking mechanisms such as handoff locks have been developed, in order to provide an orderly procedure for scheduling access time to a shared resource for two or more threads, which all want to use the resource at the same time.

In its operation, a handoff locking mechanism initially provides a lock to a thread, from a particular processor, whereby such thread is granted access to a specified shared resource. While this thread holds the lock, other software threads that attempt to obtain the lock, in order to access the specified resource, will fail to do so. Accordingly, each of these threads will append itself to a list of lock waiters, i.e., threads waiting for the lock, wherein the list is associated with the locking mechanism.

Each of the waiter threads is thus effectively placed into a queue, and is also placed into a sleep state. When the thread holding the lock releases the lock, it will select one of the waiter threads to be woken up (or the sole waiter if there is only one), and will then "hand off" the lock to the selected thread. The selected thread will be the one that has been waiting longest in the queue, or that has highest priority based on some other prespecified criterion. The handoff lock mechanism thus provides fairness and orderliness in making the lock available to threads from different processors, to enable each of them to access the shared resource in turn.

In the use of a handoff lock as described above, each thread that holds the lock will typically take a time A to perform a specified task, while it has access to the shared resource. In addition, following release of the lock by the thread holding it, an additional time B can be required, in order to select the waiter thread with first priority, to then wake up the selected thread, and to finally hand off the lock to the selected thread. Thus, a total time of A+B could be required for each waiting thread. If the number of waiter threads is large, for example 10, an additional thread sent from a processor to use the shared resource may have to wait on the order of 10 (A+B) for access to the shared resource. Moreover, it is quite common for B to be significantly greater than A. In this situation, if the number of waiting threads is substantial, the amount of time that a shared resource is not performing useful work will be comparatively large, even though a number of threads are waiting to access the resource.

SUMMARY

Embodiments of the invention provide a method, apparatus and computer program product for enabling a thread to acquire a lock associated with a shared resource, when a locking mechanism is used therewith, wherein each embodiment reduces waiting time and enhances efficiency in using the shared resource. One embodiment is associated with a plurality of processors, which includes two or more processors that each provides a specified thread to access a shared resource. The shared resource can only be accessed by one thread at a given time, a locking mechanism enables a first one of the specified threads to access the shared resource while each of the other specified threads is retained in a waiting queue, and a second one of the specified threads occupies a position of highest priority in the queue. The method includes the step of identifying a time period between a time when the first specified thread releases access to the shared resource, and a later time when the second specified thread becomes enabled to access the shared resource. Responsive to an additional thread that is not one of the specified threads being provided by a processor to access the shared resource during the identified time period, it is determined whether a first prespecified criterion pertaining to the specified threads retained in the queue has been met. Responsive to the first criterion being met, the method determines whether a second prespecified criterion has been met, wherein the second criterion is that the number of specified threads in the queue has not decreased since a specified prior time. Responsive to the second criterion being met, the method then decides whether to enable the additional thread to access the shared resource before the second specified thread accesses the resource.

DETAILED DESCRIPTION

Figure 1:
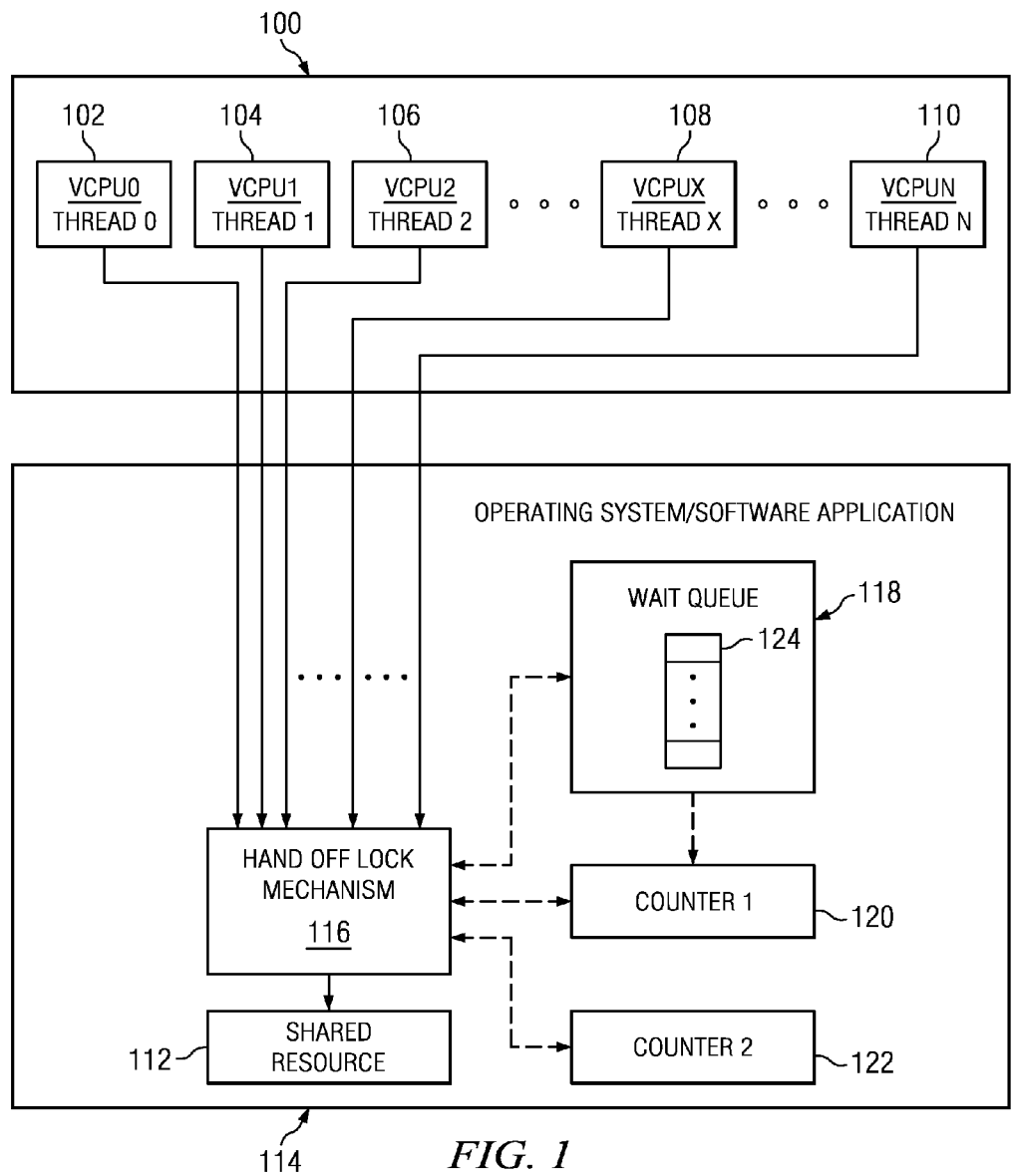
FIG. 1 is a schematic diagram showing respective components for implementing an embodiment of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, there is shown computer processor hardware 100 provided with a plurality of discrete processors, represented in FIG. 1 by processing units 102-110. In a useful embodiment, the units 102-110 respectively comprise virtual processors (vcpu's) that result from shared processor partitioning, which is a form of Logical partitioning. A shared processor partition, or micropartition, is activated by a hypervisor (not shown) which partitions a physical or hardware processor to establish the processing capability for respective virtual processors 102-110, which are also referenced as vcpu0-vcpu2, vcpuX and vcpuN, respectively.

Embodiments of the invention are not limited to virtual processors. For example, in another embodiment processors 102-110 could each comprise a discrete hardware device.

Each of the virtual processors of FIG. 1 produces at least one software thread, interrupt handler or process. Such threads are represented in FIG. 1 by Threads 0, 1, 2, X and N, corresponding to processors 102-110, respectively. Each of these threads needs to be able to access and use a shared resource 112 at various times, in order to perform some task, wherein resource 112 is associated with an operating system or software application 114. However, while threads from different processors may all need to use shared resource 112, only one thread may access the resource at any given time. By way of example, resource 112 may comprise one of the types of shared resources described above, such as an Ethernet transmit device driver.

In view of the above, there frequently will be contention between the threads of different processors, whenever two or more threads need to use the resource 112 at the same time. Accordingly, to resolve such contentions and enable orderly access to the resource for all such threads, a handoff lock mechanism 116 is placed between shared resource 112 and each of the processors 102-110, to receive respective threads therefrom. The locking mechanism 116 has a lock associated with it. If a first thread from one of the processors requires access to shared resource 112 and acquires the lock, the first thread may then proceed to use the shared resource. Moreover, no other thread may use the resource until the first thread releases the lock.

These events are compatible with conventional practice, as described above. However, the procedure for determining which thread gets to be the next one to access the shared resource, after the first thread releases the lock, departs from conventional practice and is in accordance with embodiments of the invention, as described hereinafter in further detail. Also, it is to be understood that an action described herein as being taken by one of the threads, with respect to the lock, is equivalent to the action being taken by the virtual processor that produced the thread.

Referring further to FIG. 1, there is shown a wait queue 118 associated with handoff lock 116. If a first thread is holding the lock while one or more other threads seeks to acquire the lock, in order to access resource 112, each of those threads is put to sleep and added to wait queue 118. The first position, or front end 124 of queue 118 is the location for the thread that has highest priority in the queue. Under certain conditions, the thread in this position would be woken up and given the lock, after the lock was released by the thread which had been holding it. Priority in queue 118 could be determined on a first in, first out (FIFO) or priority basis, so that the thread at position 124 would always be the thread that had been waiting longest in the queue. The newest or most recent thread sent to access the shared resource would be placed at the back of the queue. The queue may be implemented by placing the respective waiting threads on a linked list, with pointers to the highest priority and lowest priority of these threads.

It is to be appreciated that as used herein, the term "thread of highest priority in the queue" and variations of such term means the next thread in the queue that will receive the lock based on a specified policy, wherein the policy can include giving the lock to the longest waiting thread in the queue; giving the lock to a thread according to a most favorable software priority; or giving the lock to a thread in accordance with some other known mechanism for selecting priority.

As described above, the time (A+B) is the time required for a waiter thread in the queue to receive the lock and access the shared resource, and to then have the lock handed off to the next waiter thread. If the total number of waiter threads is N, and if a new thread that seeks access to the resource would be placed at the back of the queue, this new thread would have to wait a time of N (A+B) for access. However, as further described above, A is the time that a thread is holding a lock, whereas B is the time following release of the lock by the holding thread, until another thread acquires the lock. Moreover, the time B can be significantly greater than the time A. Accordingly, an embodiment of the invention is provided to enable a new thread, which seeks to access the shared resource during a time B, to be considered for selection as the next thread to receive the lock. Herein, the terms "new thread" and "additional thread" mean a thread that was not previously a waiter thread, or a thread that has not been waiting in the queue.

In order to implement the embodiment of the invention, two throttles or criteria are established. These criteria are applied to a new thread that is sent to access the shared resource during a time period B, that is, a time following release of the lock by a thread, and prior to the highest priority waiter thread acquiring the lock. If the two criteria are both met, the new thread is enabled to compete with the highest priority waiter thread to be the next recipient of the lock.

As a first criterion, the number of waiter threads in the queue must be greater than one, or some other prespecified number. The prespecified number could also be selected based on a relationship of the number of waiter threads to the number of virtual processors. As the second criterion, it must be shown that the number of waiter threads has not decreased, since the last time that the lock was handed off to a thread.

The first criterion could be implemented by operating the lock mechanism 116 to periodically query 118 to provide the number of waiter threads contained therein. This would have the effect of short-cutting the wait mechanism when the potential wait time is large. The query would be made each time there was a handoff of the lock to one of the threads.

To implement the second criterion, FIG. 1 shows counters 120 and 122. Counter 120 is coupled to queue 118, and is continually provided with the total number of waiter threads in queue 118. Each time the number of waiter threads changes, counter 120 is updated to show the change. Thus, counter 120 shows the number of waiter threads at any given time. In addition, each time the lock is handed off to a thread, the number of waiter threads in queue 118 at that time is entered into counter 122. Counter 122 thereby always shows the number of waiter threads when the last handoff of the lock to a thread occurred. Accordingly, by comparing the counts of counters 120 and 122, locking mechanism 116 can readily determine whether the number of waiter threads has increased, decreased or remained the same since the last handoff.

If both the first and second criteria are met for a new thread, it is still necessary to decide whether the lock should be given to the new thread, or to the thread with the highest priority in the queue. Usefully, locking mechanism 116 could make this decision based simply on timing. For example, if it was determined that both of the above criteria were met for the new thread before the highest priority waiter thread had received the lock, the lock would be given to the new thread. Otherwise, the lock would go to the highest priority waiter thread. Alternatively, other criteria could be used to determine whether the new thread or the highest priority waiter thread would acquire the lock. If the new thread did not take the lock, the new thread would be placed in the queue and become a waiter thread.

Figure 2:
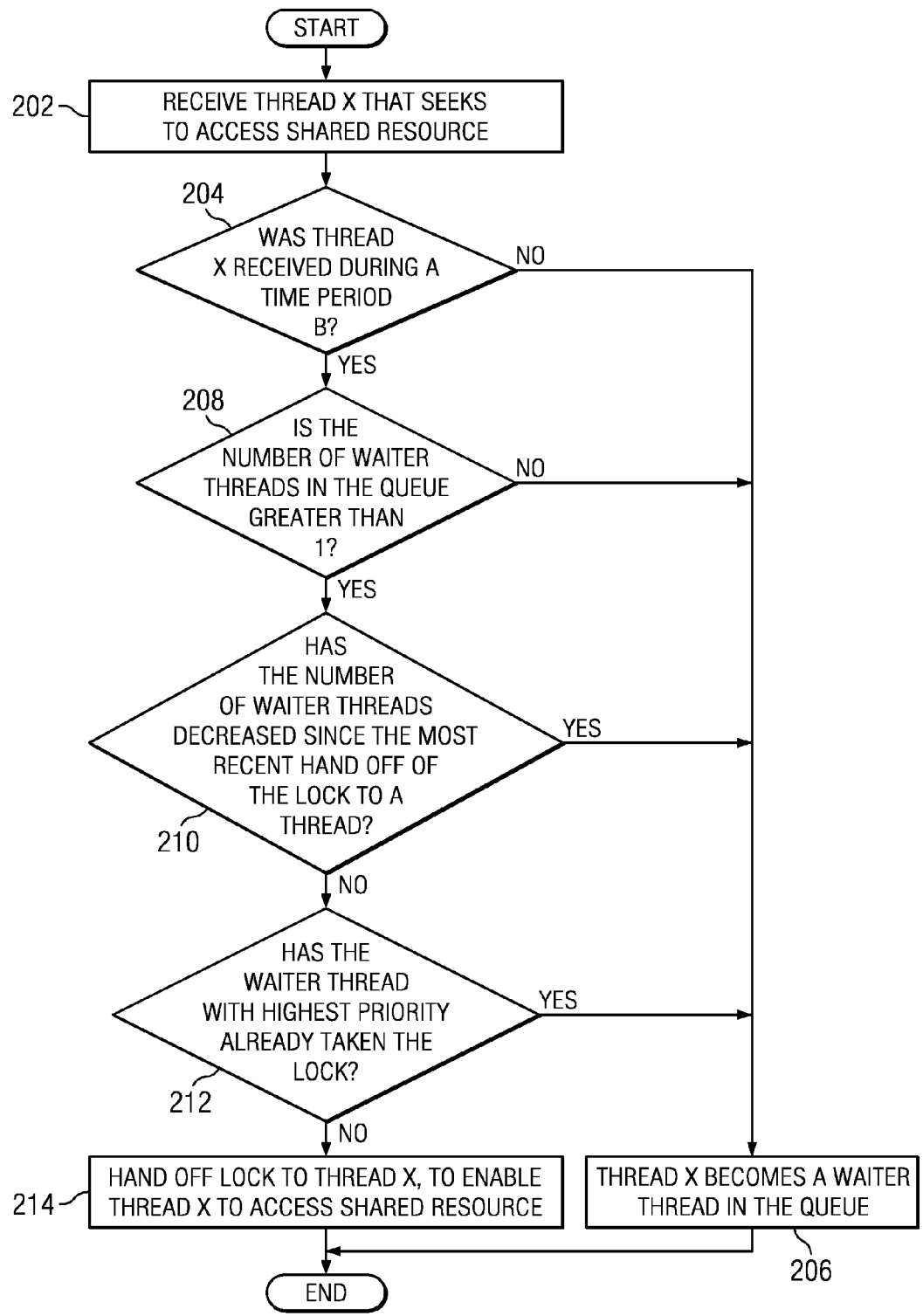
FIG. 2 is a flowchart showing steps of a method that comprises an embodiment of the invention.

Referring to FIG. 2, there is shown a flowchart illustrating steps of an embodiment of the invention. At step 202 a thread X is received at lock mechanism 116 from virtual processor 108, wherein thread X seeks to access shared resource 112. At decision step 204, it must be determined whether or not the thread X was received during a time period B. As described above, a time period B begins when a thread releases the lock of mechanism 116, and continues until another thread takes up or acquires the lock. If the determination at step 204 is affirmative, the method proceeds to step 208. Otherwise, the method proceeds to step 206. At step 206 thread X becomes a waiter thread in the queue, and the method of FIG. 2 ends.

Decision step 208 determines whether or not the number of waiter threads is greater than one. This is one of the two criteria discussed above, for enabling a non-waiting thread to attempt to take the lock ahead of a waiter thread. If the determination at step 208 is negative the method proceeds to step 206, and otherwise proceeds to step 210. Step 210 determines whether the number of waiter threads has decreased, since the last handoff of the lock to a thread. This is the second of the two criteria. If the result of step 210 is affirmative the method proceeds to step 206, and otherwise goes to step 212.

Following steps 208 and 210, step 212 determines whether the waiter thread with the highest priority in the queue has already taken the lock. If it has, the method proceeds to step 206. However, if the result of step 212 is negative, the lock is handed off to thread X at step 214, and the method of FIG. 2 ends.

For the threads respectively provided by virtual processors vcpu0-vcpu2 and vcpuX, that is, threads 0-2 and thread X, and for the two criteria respectively set forth at steps 208 and 210 of FIG. 2, the following example further illustrates an embodiment of the invention. As described above, action taken by one of the threads with respect to the lock is equivalent to the same action being taken by the processor that produced the thread.

Time

---

1    vcpu0 takes the lock { 0 waiters at take }
2    vcpu1 blocks on lock { 1 waiters }
3    vcpu2 blocks on lock { 2 waiters }
3    vcpu0 releases lock, wakes up vcpu1's thread { 2 waiters at hand-off }
4    vcpuX tries for the lock. At this point, the number of waiters has increased since the last lock acquisition, so vcpu is allowed to take the lock { 2 waiters at take }
5    vcpuX releases the lock, but doesn't wake anybody up, since vcpu1's thread is next { 2 waiters }
6    vcpu1 takes the lock { 1 waiter at take }
7    vcpu1 releases the lock and wakes up vcpu2's software thread { 1 waiter at hand-off }
8    vcpuX attempts to get the lock, but since the number of waiters now (1) is the same as at the hand-off, it blocks { 2 waiters }

-continued

```
 9 vcpu2 takes the lock { 1 waiter at take }
10 vcpu2 releases the lock and wakes up vcpuX software thread
   { 1 waiter at hand-off }
11 vcpuX takes the lock { 0 waiters }
```

Figure 3:
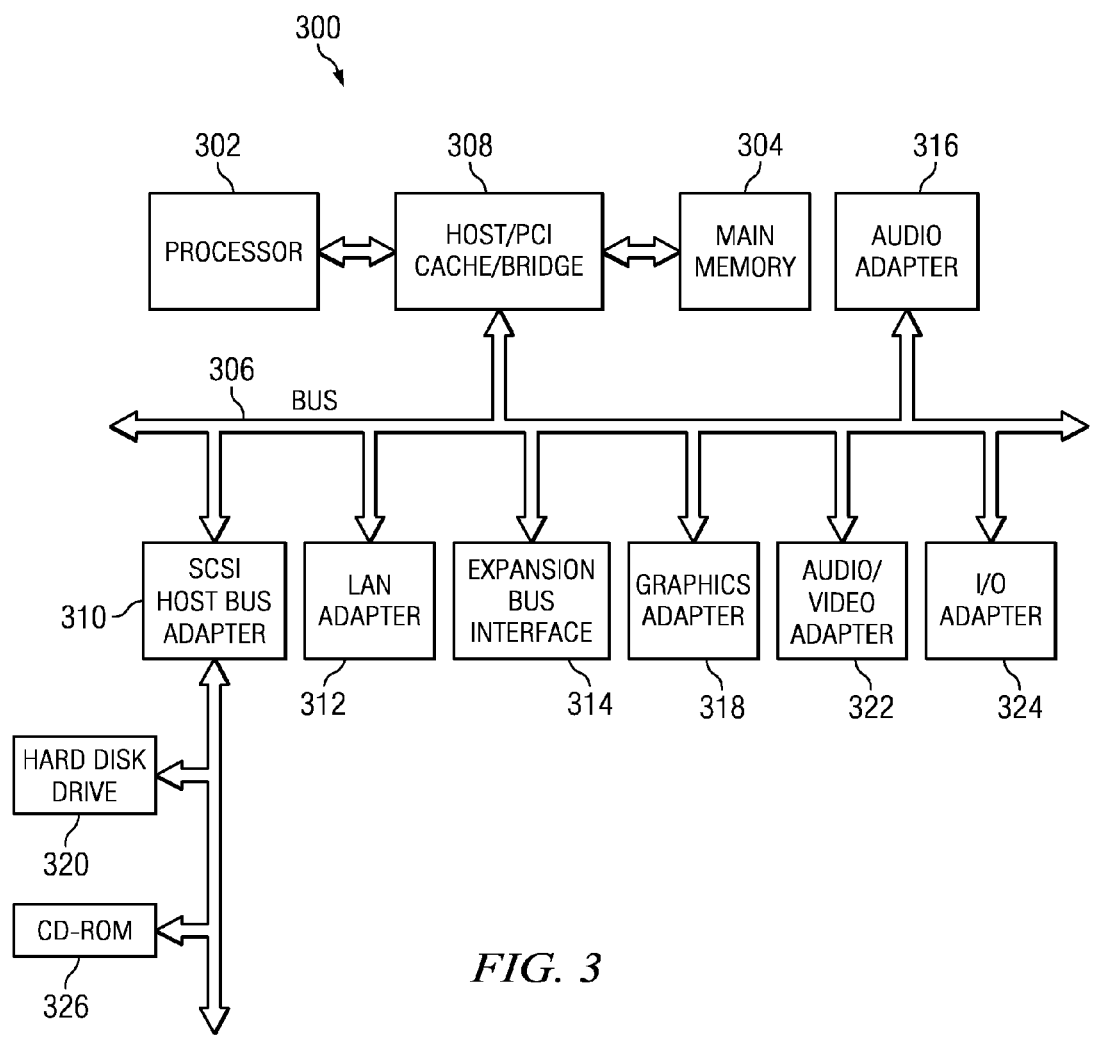
FIG. 3 is a block diagram showing a computer or data processing system that may be used in implementing embodiments of the invention.

Referring to FIG. 3, there is shown a block diagram of a generalized data processing system 300 which may be used to implement embodiments of the present invention. Data processing system 300 exemplifies a computer in which code or instructions for implementing the processes of the present invention may be located. Data processing system 300 usefully employs a peripheral component interconnect (PCI) local bus architecture. FIG. 3 shows a processor 302 and main memory 304 connected to a PCI local bus 306 through a Host/PCI bridge 308. PCI bridge 308 also may include an integrated memory controller and cache memory for processor 302.

Referring further to FIG. 3, there is shown a local area network (LAN) adapter 312, a small computer system interface (SCSI) host bus adapter 310, and an expansion bus interface 314 respectively connected to PCI local bus 306 by direct component connection. Audio adapter 316, a graphics adapter 318, and audio/video adapter 322 are connected to PCI local bus 306 by means of add-in boards inserted into expansion slots. One or more I/O adapters 324 may also be inserted into PCI bus 306 as plug-in devices. SCSI host bus adapter 310 provides a connection for hard disk drive 320, and also for CD-ROM drive 326.

An operating system runs on processor 302 and is used to coordinate and provide control of various components within data processing system 300 shown in FIG. 3. The operating system, which may be a commercially available operating system, is loaded into system 300 by Open Firmware. Instructions for the operating system and for applications or programs are located on storage devices, such as hard disk drive 320, and may be loaded into main memory 304 for execution by processor 302.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In association with a plurality of processors including two or more processors that each provides one of a set of specified threads to access a shared resource, wherein the shared resource can only be accessed by one thread at a given time, a locking mechanism enables a first one of the set of specified threads to access the shared resource while each of the other specified threads is retained in a waiting queue, and a second one of the specified threads occupies a position of highest priority in the queue, a method comprising the steps of:
   identifying a time period between a time when the first specified thread releases access to the shared resource, and a later time when the second specified thread becomes enabled to access the shared resource;
   responsive to an additional thread that is not one of the specified threads being provided by a processor to access the shared resource during the identified time period, determining whether a first prespecified criterion pertaining to the specified threads retained in said queue has been met, said first prespecified criterion is that the number of threads retained in said queue during said identified time period is greater than a number which is determined from a specified relationship of the number of threads in the queue to the number of processors in said configuration of processors;
   responsive to said first criterion being met, determining whether a second prespecified criterion has been met, wherein said second criterion is that the number of specified threads in said queue has not decreased since a specified prior time; and
   responsive to said second criterion being met before said second specified thread acquires said lock, enabling said additional thread to access the shared resource before the second specified thread accesses the shared resource.

2. The method of claim 1, wherein:
   responsive to either or both of the first prespecified criterion or the second prespecified criterion not being met, placing said additional thread into said queue.

3. The method of claim 1, wherein:
   said first prespecified criterion is that the number of threads retained in said queue during said identified time period is greater than one.

4. The method of claim 1, wherein:
   said locking mechanism comprises a handoff lock mechanism that provides a lock, wherein the lock is sequentially acquired by different threads, and a thread becomes enabled to access the shared resource upon acquiring said lock.

5. The method of claim 4, wherein:
   said second criterion is that the number of specified threads in said queue has not decreased since the last time the lock was acquired by a thread.

6. The method of claim 5, wherein:
   a first counter is continually updated to show the current number of waiting threads in said queue at a given time, a second counter is continually updated to show the number of waiting threads each time the lock is acquired by a thread, and the contents of said first and second counters are selectively compared with each other to determine whether said second criterion has been met.

7. The method of claim 1, wherein:
   each processor of said configuration comprises a virtual processor.

8. The method of claim 1, wherein:
   each processor of said configuration comprises a real processor.

9. In association with a plurality of processors including two or more processors that each provides a specified thread to access a shared resource, wherein the shared resource can only be accessed by one thread at a given time, a locking mechanism enables a first one of the specified threads to access the shared resource while each of the other specified threads is retained in a waiting queue, and a second one of the specified threads occupies a position of highest priority in the queue, a computer program product executable in a non-transitory computer readable storage medium comprising:
   instructions for identifying a time period between a time when the first specified thread releases access to the shared resource, and a later time when the second specified thread becomes enabled to access the shared resource;
   instructions for responsive to an additional thread that is not one of the specified threads being provided by a processor to access the shared resource during the identified time period, for determining whether a first prespecified criterion pertaining to the specified threads retained in said queue has been met, said first prespecified criterion is that the number of threads retained in said queue during said identified time period is greater than a number which is determined from a specified relationship of the number of threads in the queue to the number of processors in said configuration of processors;
   instructions for responsive to said first criterion being met, for determining whether a second prespecified criterion has been met, wherein said second criterion is that the number of specified threads in said queue has not decreased since a specified prior time; and
   instructions for responsive to said second criterion being met before said second specified thread acquires said lock, for enabling said additional thread to access the shared resource before the second specified thread accesses the shared resource.

10. The computer program product of claim 9, wherein:
    responsive to deciding not to enable said additional thread to access the shared resource before the second specified thread, said additional thread is placed into said queue.

11. The computer program product of claim 9, wherein:
    said first prespecified criterion is that the number of threads retained in said queue during said identified time period is greater than one.

12. The computer program product of claim 9, wherein:
    said locking mechanism comprises a handoff lock mechanism that provides a lock, wherein the lock is sequentially acquired by different threads, and a thread becomes enabled to access the shared resource upon acquiring said lock.

13. The computer program product of claim 12, wherein:
    said second criterion is that the number of specified threads in said queue has not decreased since the last time the lock was acquired by a thread.

14. In association with a plurality of processors including two or more processors that each provides a specified thread to access a shared resource, wherein the shared resource can only be accessed by one thread at a given time, a locking mechanism enables a first one of the specified threads to access the shared resource while each of the other specified threads is retained in a waiting queue, and a second one of the specified threads occupies a position of highest priority in the queue, a computer comprising:

- a memory having computer usable instructions encoded thereon;
- a bus connecting the memory to a processor; and
- a processor wherein the processor executes the computer usable instructions:
- to identify a time period between a time when the first specified thread releases access to the shared resource, and a later time when the second specified thread becomes enabled to access the shared resource;
- responsive to an additional thread that is not one of the specified threads being provided by a processor to access the shared resource during the identified time period, to determine whether a first prespecified criterion pertaining to the specified threads retained in said queue has been met, said first prespecified criterion is that the number of threads retained in said queue during said identified time period is greater than a number which is determined from a specified relationship of the number of threads in the queue to the number of processors in said configuration of processors;
- responsive to said first criterion being met, to determine whether a second prespecified criterion has been met, wherein said second criterion is that the number of specified threads in said queue has not decreased since a specified prior time; and
- responsive to said second criterion being met before said second specified thread acquires said lock, to enable said additional thread to access the shared resource before the second specified thread accesses the shared resource.

15. The apparatus of claim 14, wherein:
responsive to deciding not to enable said additional thread to access the shared resource before the second specified thread, said additional thread is placed into said queue.

16. The apparatus of claim 14, wherein:
said first prespecified criterion is that the number of threads retained in said queue during said identified time period is greater than one.

17. The apparatus of claim 14, wherein:
said locking mechanism comprises a handoff lock mechanism that provides a lock, wherein the lock is sequentially acquired by different threads, and a thread becomes enabled to access the shared resource upon acquiring said lock.

18. The apparatus of claim 17, wherein:
said second criterion is that the number of specified threads in said queue has not decreased since the last time the lock was acquired by a thread.

* * * * *